United States Patent
Lim et al.

(10) Patent No.: US 6,466,547 B1
(45) Date of Patent: Oct. 15, 2002

(54) SYSTEM AND METHOD FOR OPTIMIZING FORWARD POWER CONTROL IN A PERSONAL COMMUNICATION SERVICE (PCS) CODE DIVISION MULTIPLE ACCESS (CDMA) SYSTEM USING A LABORATORY TEST

(75) Inventors: Young-sik Lim; Pyeong-hwan Wee, both of Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/291,753

(22) Filed: Apr. 14, 1999

(30) Foreign Application Priority Data

Apr. 14, 1998 (KR) .............................. 98-13186

(51) Int. Cl.$^7$ .............................................. H04L 12/26
(52) U.S. Cl. ..................... 370/241; 370/252; 455/423; 455/67.1
(58) Field of Search ................................ 370/311, 328, 370/329, 335, 342, 241, 242, 252, 296; 455/423, 424, 501, 63, 66, 67.1, 300; 375/224, 225

(56) References Cited

U.S. PATENT DOCUMENTS

| | | | | |
|---|---|---|---|---|
| 5,822,318 A | * | 10/1998 | Tiedemann et al. | 370/391 |
| 6,067,458 A | * | 5/2000 | Chen | 455/39 |
| 6,173,188 B1 | * | 1/2001 | Kim | 455/239.1 |
| 6,253,085 B1 | * | 6/2001 | Bender | 370/331 |
| 6,298,241 B1 | * | 10/2001 | Hong | 455/13.4 |
| 6,304,562 B1 | * | 10/2001 | Kim et al. | 370/332 |
| 6,330,462 B1 | * | 12/2001 | Chen | 455/39 |
| 6,335,918 B1 | * | 1/2002 | Mourier | 370/229 |
| 6,356,531 B1 | * | 3/2002 | Soliman | 370/241 |

* cited by examiner

Primary Examiner—William Trost
Assistant Examiner—Congvan Tran
(74) Attorney, Agent, or Firm—Dilworth & Barrese, LLP

(57) ABSTRACT

A forward power control method in a PCS CDMA system to determine parameter values associates with the forward power control, which minimize interference imposed on neighboring cells by differentiating the amount of power allocation in accordance with the state of link of each subscriber, and maximize forward power control performance through a test in a laboratory by manipulating a channel change to have a sinusoidal form with a period.

20 Claims, 5 Drawing Sheets

|  | Bigup_delta | Smallup_delta | Down_delta | Down_Frame_Count | Max_Tx Gain | Min_Tx Gain | Normal_Gain |
|---|---|---|---|---|---|---|---|
| CASE 1 | 5 | 3 | 1 | 60 | 80 | 35 | 80 |
| CASE 2 | 10 | 5 | 1 | 60 | 80 | 35 | 80 |
| CASE 3 | 5 | 3 | 1 | 80 | 80 | 35 | 80 |
| CASE 4 | 10 | 5 | 1 | 80 | 80 | 35 | 80 |
| CASE 5 | 5 | 3 | 1 | 60 | 110 | 35 | 80 |
| CASE 6 | 10 | 5 | 1 | 60 | 110 | 35 | 80 |
| CASE 7 | 5 | 3 | 1 | 80 | 110 | 35 | 80 |
| CASE 8 | 10 | 5 | 1 | 80 | 110 | 35 | 80 |

*FIG. 2*

SYSTEM AND METHOD FOR OPTIMIZING FORWARD POWER CONTROL IN A PERSONAL COMMUNICATION SERVICE (PCS) CODE DIVISION MULTIPLE ACCESS (CDMA) SYSTEM USING A LABORATORY TEST

BACKGROUND

1. Field of the Invention

The present invention generally relates to personal communication systems. More specifically, the present invention relates to a system and method for optimizing the forward power control in a personal communication services (PCS) code division multiple access (CDMA) system.

2. Description of the Related Art

A PCS CDMA system checks the generation of a "forward frame error" per frame and carries an erasure indicator bit (EIB) in a reverse frame, in support of forward power control. Parameters associated with PCS forward power control include: Bigup_delta, smallup_delta, down_delta, down_frame_count, max_tx_gain, min_tx_gain, normal_gain, etc.

Tracking error is considered an evaluation criterion for forward power control performance, defined as a difference between the ratio of signal energy per bit to noise energy, $$E_b/N_o$$

measured at a mobile station and the $$E_b/N_o$$

required to maintain a 1% frame error rate.

For an 800 MHz digital cellular CDMA system, forward power control optimization is performed as a live field test. The process can generally be divided into three steps: 1) preparation; 2) field testing; and 3) optimization, each of which are defined below.

A. Preparation

To prepare for live field testing of forward power control performance in accordance with the prior art, a test van which simulates a mobile diagnostic monitor (MDM) and a global positioning system (GPS) for forward link data logging, and a notebook PC for data collection platform (DCP) logging are required.

Furthermore, a test telephone, a zip drive for data backup and a switched virtual connection (SVC) option 9 are required. In addition, eight combinations of forward power control parameters are constructed for analysis.

B. Live Field Testing

Live field testing of forward power control performance comprises the steps of:

1. Checking a receive/transmit path of a system and confirming that there are no faults, i.e., the path operation is normal (step 1);
2. Setting parameter values for the first of eight predetermined parameter combinations (case 1) at a base station manager (BSM) (step 2); and
3. Logging data associated with service areas of a base transceiver station (BTS) along a determined route using a test van with a data collection platform (DCP) and a mobile diagnostic monitor (MDM) (step 3).

A CDMA analysis tool analyzes the forward power control performance by calculating the forward and reverse average frame error rate. In addition, the average traffic channel digital gain, average $$E_C/I_o$$

and average RX_PWR are calculated.

C. Optimization

Optimizing forward power control in accordance with the prior art includes the steps of:

1. Repeating steps 1 and 2 of part B for all eight parameter combinations.
2. Calculating an average forward frame error rate, average reverse frame error rate and average digital gain for all eight cases.
3. Calculating the average $$E_C/I_o$$

and $R_x\_P_{wr}$ of each calculated result of step 2.
4. Finding an optimal forward parameter from the measured data for all eight cases. To do so, five values are measured (a forward frame error rate, a reverse frame error rate, an average digital gain, an average Ec/Io and RX_PWR) for eight different parameter combinations. A parameter combination is selected having the best measured values for forward power control.

Since a forward power control algorithm in a PCS system is different from a conventional 800 MHz band digital cellular CDMA system, the method of optimization must be different.

Furthermore, the optimization method described for forward power control is problematic in that it is impossible to duplicate the identical radio environment for each of the eight parameter combinations, since testing is performed in a real field setting.

As a result, a CDMA forward power control technique based on IS-95 was developed. An object of this technique is to minimize interference on neighboring cells by differentiating power allocation in accordance with the state of each subscriber link.

Since the aforementioned forward power control performance is known to be different in accordance with the associated parameter, optimal parameters are used for actual system performance test. However, optimal parameters must be defined with respect to some defined criteria. For example, if tracking error is selected as the criteria to judge forward power control performance, then the parameter confirmation which gives the best results for forward power control based on tracking error is selected as optimal.

There exists a need, therefore, for a simple and effective method for optimizing forward power control. Until now, tracking error has not been considered as a criterion for meeting the objectives of optimizing forward power control.

SUMMARY OF THE INVENTION

It is an object of the present invention to provide a system and method for optimizing forward power control parameters simply and effectively using tracking error as a criterion for evaluating forward power control performance in a PCS CDMA system.

Definitions

Channel change: A channel signal from a base transceiver station is changing due to interference, noise and shadowing in a radio environment. The present invention simulates a channel change in a live radio environment by artificially manipulating a sinusoid.

According to one embodiment of the present invention, a laboratory test method for determining parameters optimizing the forward power control in a PCS CDMA system comprises the steps of: establishing a laboratory test environment to simulate noise and fading effects on a channel change, which occurs in a live radio environment, by manipulating the frequency and the amplitude of a laboratory generated sinusoid, determining an amplitude value and cycle value of the channel change such that the pilot signal strength (i.e., the ratio of energy per chip to noise)

$$\frac{E_c}{I_O}$$

of a mobile station changes within a predetermined limit, setting forward parameter values for a plurality of parameter combinations by a base station manager (BSM), making a test call in accordance with switched virtual circuit option 9 (loop call), starting data logging by a data collection platform(DCP) and a mobile diagnostic monitor (MDM), terminating data logging after a predetermined time period, and storing the collected data.

According to an alternative embodiment of the present invention, a method for determining parameters to optimize the forward power control in a PCS CDMA system comprises the steps of: making channel changes by manipulating the frequency and amplitude of a sinusoid to simulate noise and shadowing, calculating a forward frame error rate, reverse frame error rate, average $$\frac{E_c}{I_O},$$

and average digital gain of data per combination of forward parameters, calculating a tracking error per combination of forward parameters, and determining optimal parameters by which the frame error rate is maintained at a predetermined value, such that the average digital gain is low and the tracking error is at its lowest.

BRIEF DESCRIPTION OF THE DRAWINGS

Other objects and advantages of the present invention will become more apparent from the detailed description set forth below and in conjunction with the attached drawings.

FIG. 2 is a table showing each of the parameter combinations in accordance with a preferred embodiment of the present invention;

Figure 4:
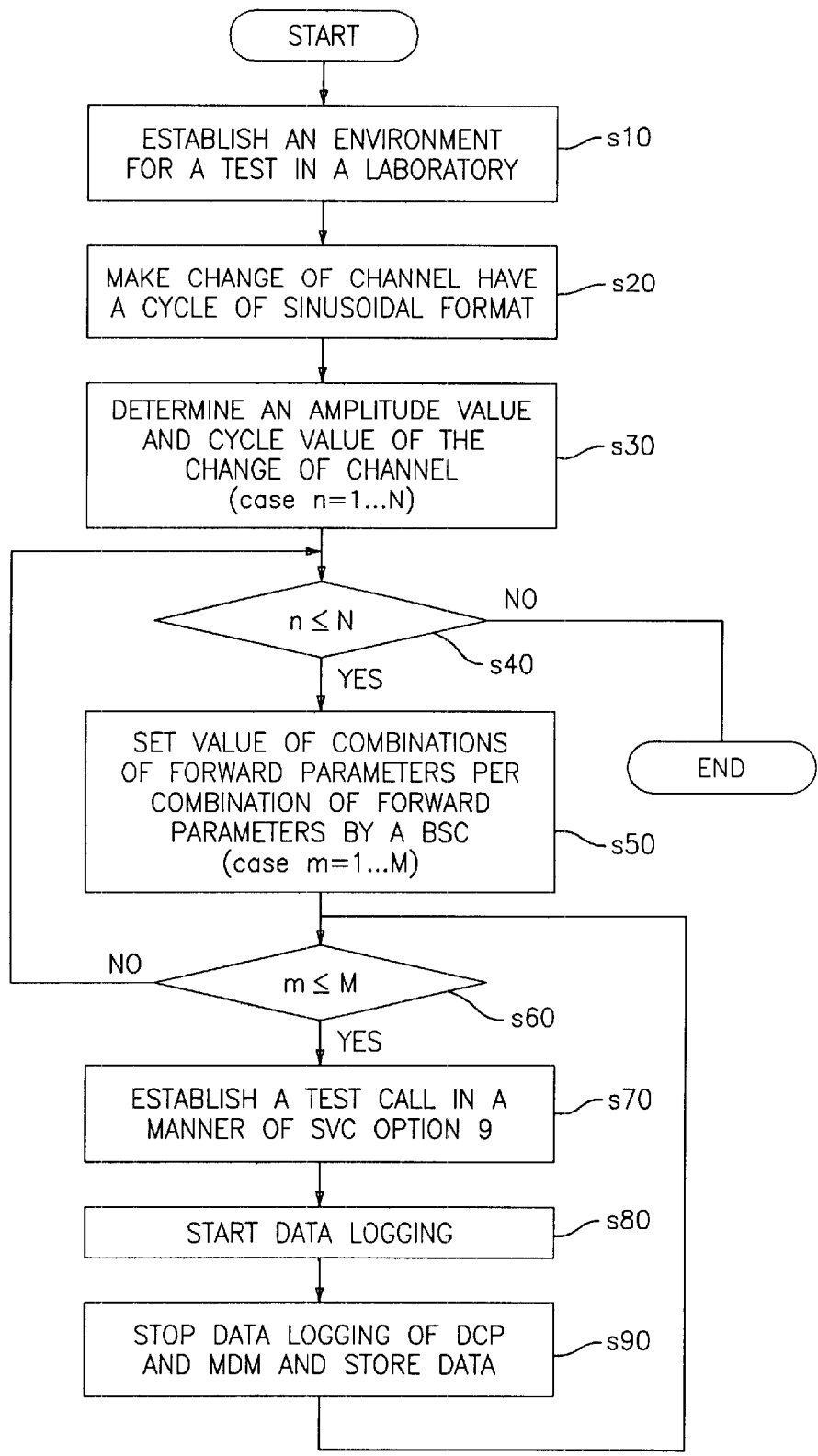
Figure 5:
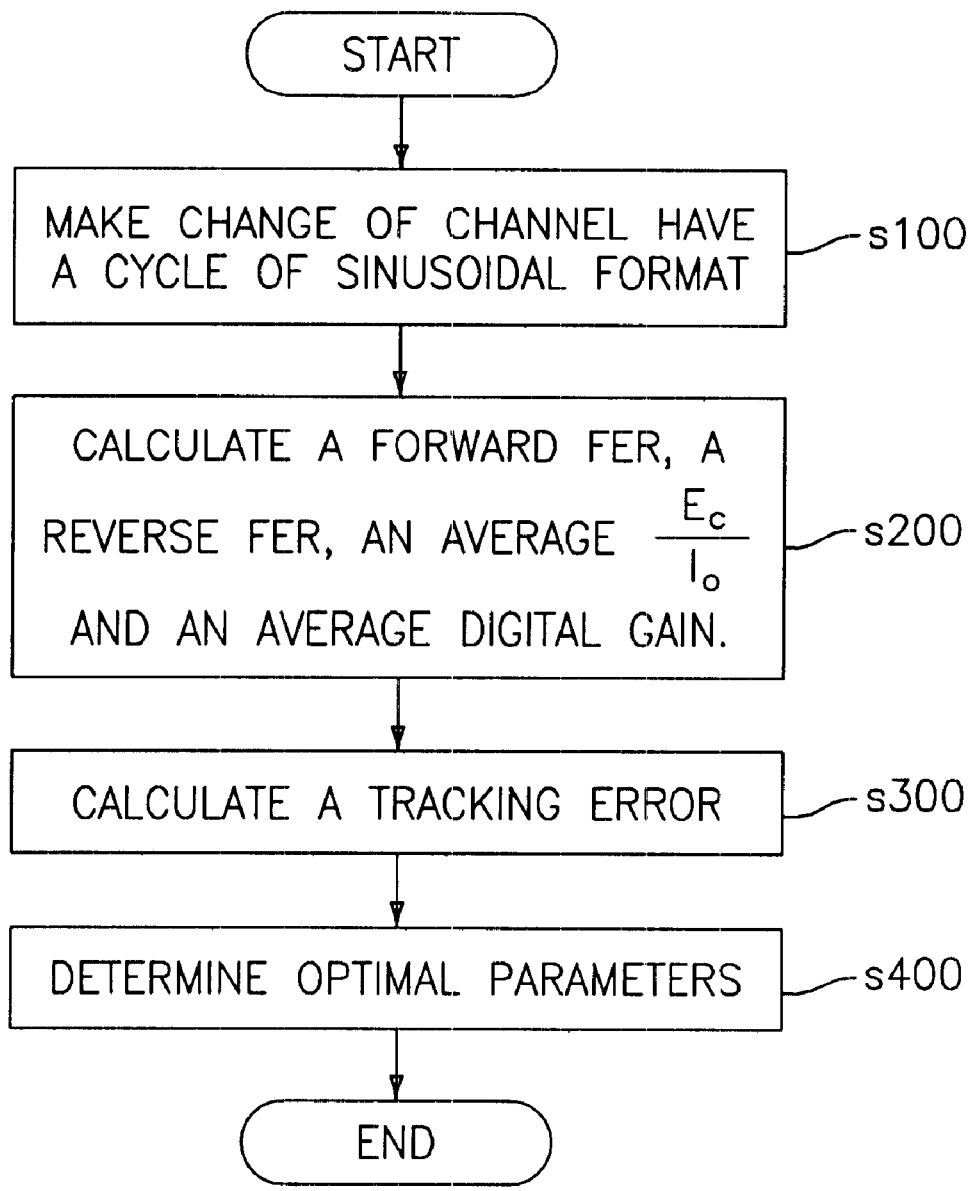

digital gain and frame error rate of case 1 of FIG. 2 for a sinusoidal cycle of 1 min. in accordance with a preferred embodiment of the present invention;

FIG. 4 is a flow diagram illustrating a method for a laboratory test to optimize forward power control in a PCS CDMA system in accordance with the present invention; and FIG. 5 is a flow diagram illustrating a method of determining parameters for optimization of forward power control in a PCS CDMA system in accordance with the present invention.

DETAILED DESCRIPTION OF THE INVENTION

The present invention is directed to a forward power control method in a PCS CDMA system which determines parameter values associated with the forward power control. The parameter values are selected with the two-fold objectives of first, minimizing interference imposed on neighboring cells by differentiating the power allocation of each subscriber in accordance with the state of the communication link and second, maximizing a forward power control efficiency through a laboratory test which simulates a channel change by generating a sinusoidal signal.

A method and system for optimizing a forward power control in a PCS CDMA system using a laboratory test will be described with reference to attached FIGS. 1–5.

To achieve forward power control optimization, the following test processes and analysis are performed.

A. A method for collecting test data is performed as follows:
1. A transmission signal from a BTS is directed to a variable attenuator 108. A control computer 105 controls the variable attenuator. Then, the variable attenuator 108 simulates the noise effect by regulating the amount of AWGN imposed on a mobile station by adjusting the frequency of the variable attenuator. The output signal of the variable attenuator 108 is then directed to a mobile station 111 via a duplexer 110. The output of the mobile station 111 is directed to a duplexer 110 and a splitter 113 and leads to a data collection platform 114 in a HINA through receive paths, i.e., Rx A or Rx B of a BTS 103.

In a live radio environment, the shadowing effect attenuates the magnitude of Ec/Io received by a mobile station. The present invention simulates the shadowing effect in a laboratory by adjusting the amplitude of the variable attenuator 108 and also by regulating the period of the variable attenuator to be 0.25 minutes to maintain the magnitude of Ec/Io to stay between −7 dB and −15 dB.

Figure 1:
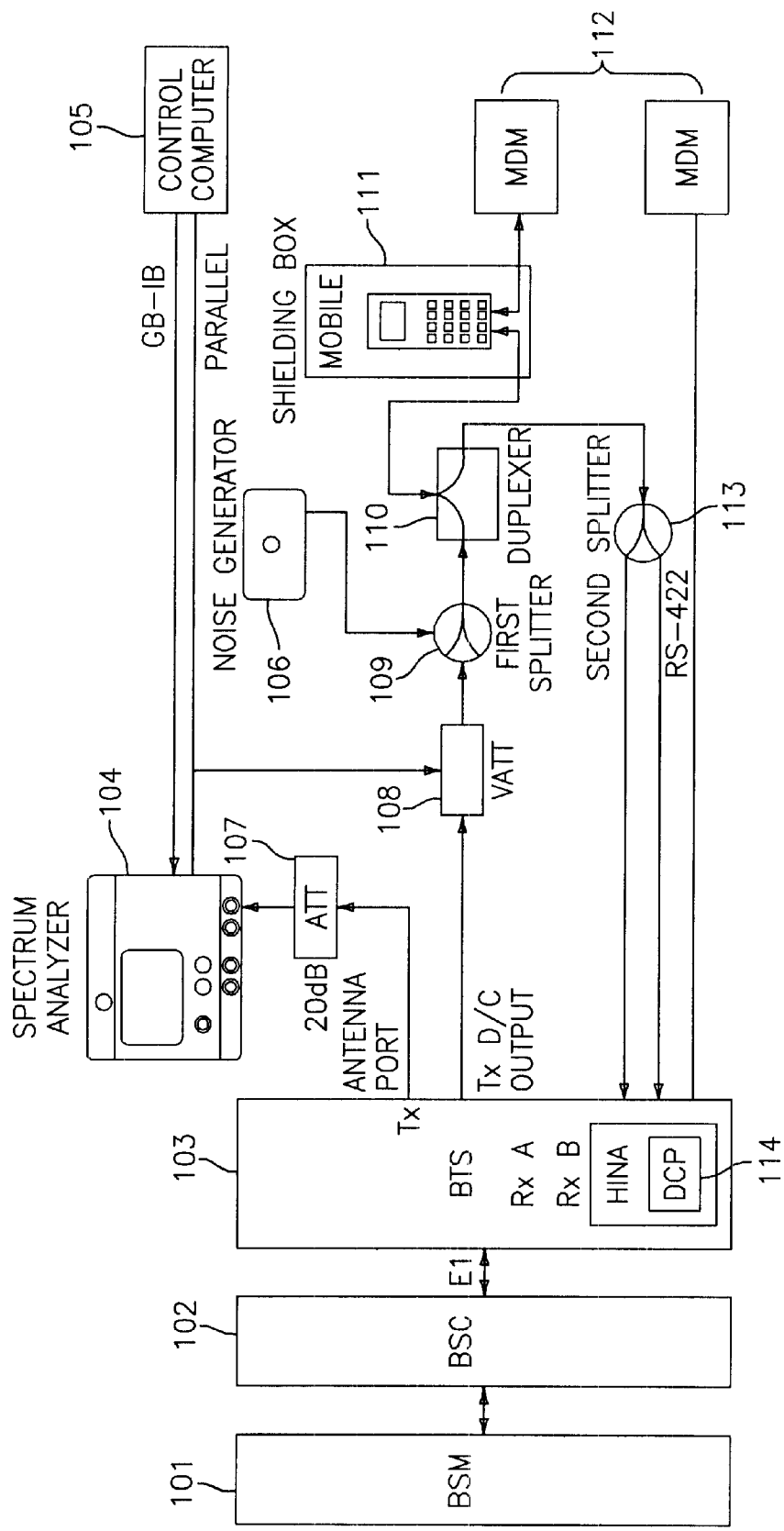
FIG. 1 is a block diagram illustrating a test environment of a laboratory in accordance with a preferred embodiment of the present invention.
Figure 3:
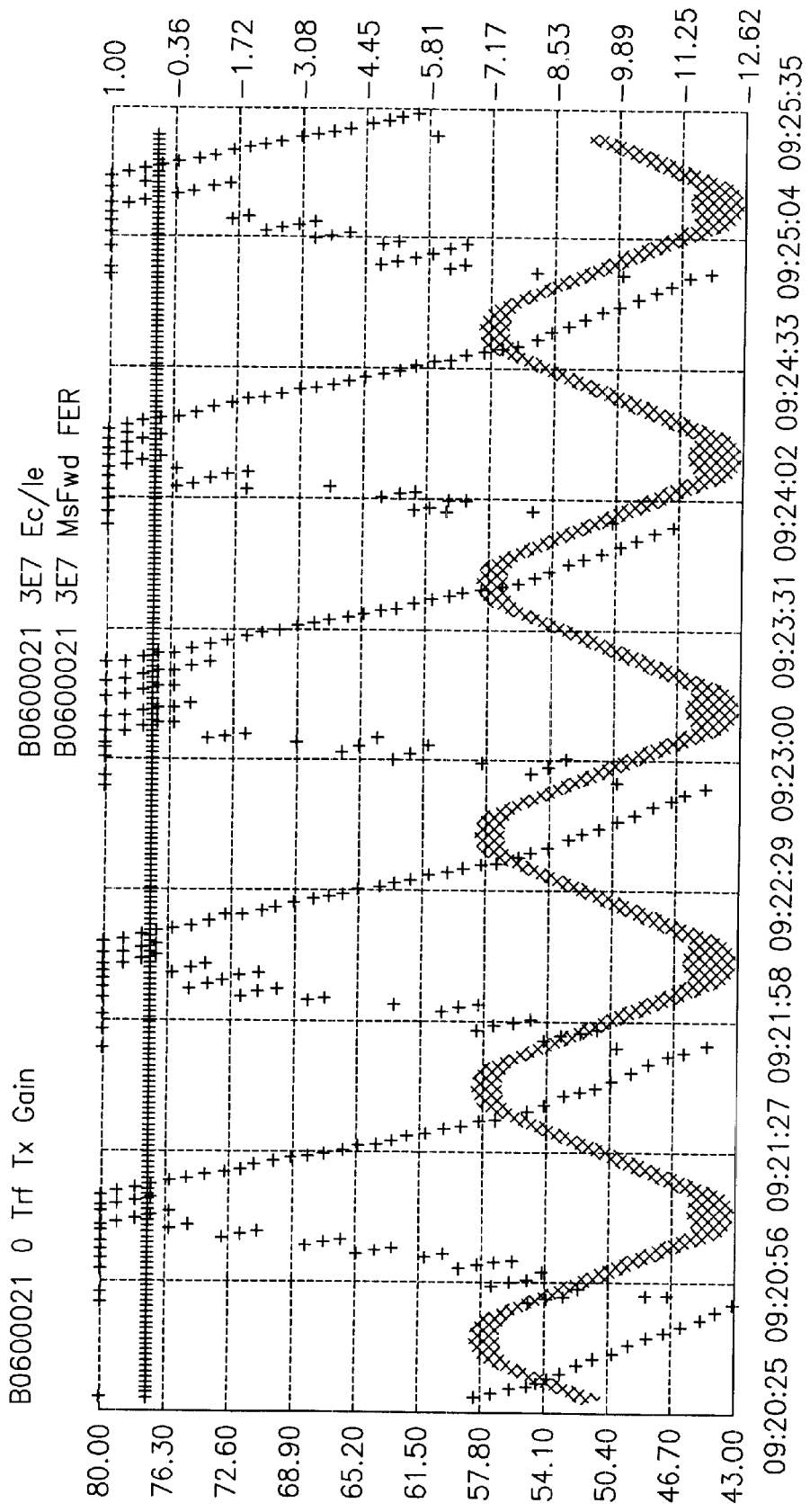
FIG. 3 is a graph illustrating the distribution of $$E_C/I_O,$$

2. Forward parameter values for the parameters combination defined as case 1 are set at a base station controller (BSC) 102.
3. The BSC 102 makes a test call to a BTS 103 in accordance with switched virtual connection (SVC) option 9, (i.e., vocoder at 13 kbps).
2. The data connection platform (DCP) 114 and the mobile diagnostic monitor (MDM) 112 in a BTS 103 start logging data specific to the test call.
3. After a time period, for example 5 minutes, the DCP 114 and MDM 112 stop data logging and store the collected data. Parameter Max_Tx Gain is stored in the DCP 114 and six other parameters, as set forth in FIG. 2, are stored in MDM 112.
4. The control computer 105 changes the frequency of the sinusoid to correspond to 0.5, 1, 2 and 4 minutes respectively, and steps 2 and 3 are repeated for each frequency setting.
5. After changing the forward parameters to the next case, steps 2–6 are repeated. Collected data is displayed for each case as shown in FIG. 3.

B. Using the collected laboratory test data from step A, a method for optimizing forward power control is as follows:

1. A forward frame error rate, reverse frame error rate, $E_C/I_O$, and average digital gain are calculated from the collected data for each case (i.e., all parameter combinations).

2. A tracking error is calculated for each case according to:

$$Tracking\ error = \left(\frac{E_b}{N_o}\right)_{measure} - \left(\frac{E_b}{N_o}\right)_{requirement},$$

where $E_b$ denotes energy per bit, and $N_o$ denotes noise spectral density.

3. Optimal parameters are then determined as those parameters which: 1) maintain the calculated frame error rate at 1%; and 2) significantly reduce the average traffic gain and the tracking error.

When the frequency of the sinusoid is set at 1 minute, for example, the distribution of $E_C/I_O$, digital gain and frame error rate for case 1 are illustrated in FIG. 3.

$E_C/I_O$ of the pilot signal in a single path in a single cell is converted to a traffic $E_C/I_O$ according to:

$$\frac{E_b}{N_O} = \frac{E}{I_O} \cdot P\_G \cdot \left(\frac{F_{traffic}}{F_{pilot}}\right)^2,$$

where P_G denotes processing gain, $F_{pilot}$ denotes a pilot channel power allocation ratio and $F_{traffic}$ denotes a traffic channel power allocation ratio. Since a MDM 112 collects only Ec/Io measured by a mobile station, the measured Ec/Io must be transformed into Ec/No, which is a signal which a BTS uses for communication with a mobile station.

From the conversion equation and test data, the results of the preferred embodiment of the present invention are:

A tracking error is 0.73 dB, an average digital gain is 63.35 and an average frame error rate is 0.49%. All of them result from the test of case 1 for a sinusoid of frequency duration of 1 minute.

FIG. 4 is a flow diagram to illustrate a method for a laboratory test to optimize forward power control in a PCS CDMA system in accordance with the present invention. As illustrated, a laboratory test environment is constructed (step 10) and change of channel is established to have a cycle of sinusoidal format (step 20).

At step 30, an amplitude value and cycle value of the change of channel are established to make the $\frac{E_c}{I_O}$ of a mobile station change only within a predetermined range (case n=1 . . . N). Thus, if n is smaller than or equal to N, (n≦N), the process will continue at step 40. Otherwise, the test will terminate.

A base station manager (BSM) 101 is initialized with a particular combination of forward parameter values for each each (i.e., case m=1 . . . M) at step 50. If m is smaller or equal to M, the process will continue to step 60, otherwise, the process will return to step 40.

A test call is established in accordance with switched virtual circuit (SVC) option 9 (loop call) at step 70. A data collection platform (DCP) 114 and a mobile diagnostic monitor (MDM) 112 start data logging at step 80, and stop after a predetermined time period whereby the data is stored and the process returns to step 60.

FIG. 5 is a flow diagram to illustrate a method of determining parameters for optimizing the forward power control in a PCS CDMA system in accordance with the present invention. A change of channel is established to have a cycle of sinusoidal format (step 100). A forward frame error rate, a reverse frame error rate, an average $\frac{E_c}{I_O}$ and an average digital gain are calculated for each combination of forward parameters (step 200).

A tracking error is calculated for each combination of forward parameters (step 300). Optimal parameters are determined to be a combination of forward parameters which make frame error rates maintain a predetermined value and the average digital gain be low and have the lowest tracking error (step 400).

The present invention simplifies the forward power control parameter performance test by simulating a change of channel by manipulating the period of a sinusoid.

Also, by using the tracking error as an evaluation criterion for the performance of forward power control, the present invention provides an objective evaluation criterion for performance.

As stated above, a forward power control method in a PCS CDMA system can find values of parameters associated with the forward power control, which minimize interference imposed on neighboring cells by differentiating the amount of power allocation in accordance with the state of link of each subscriber, and maximize forward power control performance through a test in a laboratory by making a change of channel due to shadowing effect have a cycle of sinusoidal format in a single cell and in a single path.

While the invention is susceptible to various modifications and alternative forms, specific embodiments thereof have been shown by way of example in the drawings and detailed description. It should be understood, however, that the present invention is not limited to the particular forms disclosed, but on the contrary, the intention is to cover all modifications, equivalents, and alternatives falling within the spirit and scope of the invention as defined by the appended claims.

What is claimed is:

1. A method for testing forward power control optimization in a PCS CDMA system, said method comprising the steps of:

(i) establishing a test laboratory environment to simulate a channel change which occurs in a live radio environment;

(ii) simulating a channel change by generating a sinusoid as directed by a base station manager (BSM);

(iii) simulating a shadowing and noise contribution to said channel change by determining a respective amplitude value and a cycle value of said generated sinusoid, such that the ratio of energy per chip to noise $$\frac{E_c}{I_O}$$

of a mobile station changes within predetermined upper and lower bounds;

(iv) selecting by a base station manager a particular combination of forward parameter values from among a set of combinations of forward parameter values as system values for making a test call;

(v) making the test call using said selected combination of forward parameters;

(vi) starting by a data collection platform(DCP) and a mobile diagnostic monitor (MDM) data logging to collect data for said test call including forward frame error rate, a reverse frame error rate, an average Ec/Io and an average digital gain;

(vii) stopping data logging after a predetermined time period;

(viii) storing said collected data for said combination of forward parameters;

(ix) setting another combination of forward parameters, not previously set, from among said set of combinations of forward parameters;

(x) when it is determined that there is another combination of parameters to be set, returning to step (v);

(xi) selecting an optimal combination of forward parameters from among said set of combinations of forward parameters by comparing collected data for each of said combinations of forward parameters; and (xii) setting parameters in said base transceiver station corresponding to said selected optimal combination.

2. A method as set forth in claim 1, wherein said amplitude value and said cycle value of said channel changes are determined such that said mobile station $$\frac{E_c}{I_O}$$

changes within a predetermined limit using a channel shadowing effect.

3. A method as set forth in claim 2, wherein the rate of change of a quantity of additive white gaussian noise (AWGN) is controlled for said shadowing effect.

4. A method as set forth in claim 3, wherein the rate of change of said quantity of AWGN is controlled by a control computer which controls the attenuation of a variable attenuator, said attenuation being applied to a mobile station.

5. A method as set forth in claim 1, wherein in said determining step, said predetermined lower and upper bounds are between −7 dB and −15 dB, respectively.

6. A method as set forth in claim 1, wherein said predetermined time period is 5 minutes.

7. A method as set forth in claim 1, wherein in said step of making channel change, said cycle is selected as one of 0.25, 0.5, 1, 2, 4 and 5 minutes.

8. A method as set forth in claim 7, wherein forward parameters include Bigup_delta, Smallup_delta, Down_delta, Down_Frame_count, MAX_Tx_Gain, Min_Tx_Gain and Normal_Gain.

9. A method for forward power control optimization in a PCS CDMA system, said method comprising the steps of:

making a channel change having a cycle of sinusoidal format;

calculating a forward frame error rate, a reverse frame error rate, an average $$\frac{E_c}{I_O}$$

of a pilot signal, and an average digital gain of data for a plurality of forward parameter combinations;

calculating a tracking error for each of said plurality of forward parameter combinations; and determining optimal parameters such that said frame error rates are maintained at a predetermined value, said average digital gain is low and said tracking error is its lowest value.

10. A method as set forth in claim 9, wherein said predetermined value is 1%.

11. A method as set forth in claim 9, wherein said $$\frac{E_c}{I_O}$$

of said pilot signal is converted into $$\frac{E_b}{N_O} = \frac{E_c}{I_O} \cdot P\_G \cdot \left(\frac{F_{traffic}}{F_{pilot}}\right)^2$$

in a single cell and single path, where $F_{pilot}$ is a pilot channel power allocation rate and $F_{traffic}$ is a traffic channel power allocation rate.

12. A system for optimizing forward power control by laboratory test in a PCS CDMA system, said system comprising:

(1) a base transceiver station (BTS) commanded by a base station controller, having an antenna port, a transmit direct output port and two receive ports, for establishing a test call;

(2) a mobile station for establishing a test call with said BTS;

(3) shielding means for preventing a radio signal from being received at said mobile station;

(4) attenuation means for attenuating a transmission signal from said antenna port of said BTS;

(5) spectrum analysis for analyzing a spectrum of said attenuated signal;

(6) a variable attenuator for attenuating a transmission direct signal from said transmission direct output port of said BTS;

(7) control means for controlling said spectrum analysis means and for regulating an attenuation value of said variable attenuator;

(8) noise generation means for generating a noise signal;

(9) combination means for combining a signal attenuated by said variable attenuator with said noise signal generated by said noise generation means;

(10) duplexer means for transmitting said combined signal to said mobile station and for relaying a transmission signal from said MS;

(11) dividing means for receiving said transmission signal via said duplexer means and splitting said transmission signal into two receive ports of said BTS;

(12) data collection means for collecting signals which are received via said two receive ports of said BTS; and

(13) mobile diagnostic monitor for logging data such as said data collected by said mobile station and by said data collection means in said BTS.

13. A system as set forth in claim 12, wherein said means for controlling attenuation value uses a sinusoid to control attenuation value of said variably attenuating means.

14. A system as set forth in claim 13, wherein said variably attenuating means controls a rate of change of quantity of addictive white gaussian noise (AWGN) applied to a mobile station.

15. A system as set forth in claim 12, wherein said combination means is a combiner.

16. A system as set forth in claim 12, wherein said dividing means is a splitter.

17. A system as set forth in claim 13, wherein said means for logging signals is a mobile diagnostic monitor (MDM).

18. A system as set forth in claim 13, wherein said data collection means is a data collecting platform (DCP).

19. A system as set forth in claim 13, wherein said shielding means is a shielding box.

20. A system as set forth in any of claims 12 to 19, wherein said base transceiver station and said mobile station establish a test call via wire.

\* \* \* \* \*